Jan. 11, 1955  L. G. SIMJIAN  2,699,100
CAMERA
Filed Jan. 9, 1953  2 Sheets-Sheet 1
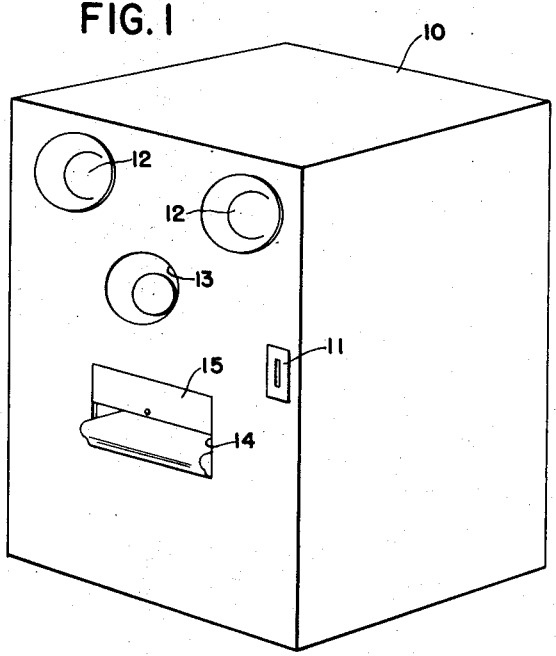
FIG. 1
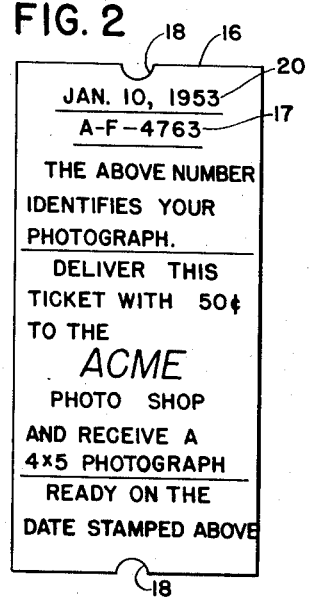
FIG. 2
JAN. 10, 1953
A-F-4763
THE ABOVE NUMBER
IDENTIFIES YOUR
PHOTOGRAPH.
DELIVER THIS
TICKET WITH 50¢
TO THE
ACME
PHOTO SHOP
AND RECEIVE A
4×5 PHOTOGRAPH
READY ON THE
DATE STAMPED ABOVE
FIG. 3
| | | |
|---|---|---|
| LIGHTS | ON | OFF |
| LENS SHUTTERS | OPEN | CLOSED |
| CLUTCHES | | ENGAGED |
| MOTOR | RUNNING | |
| DATE STAMP | | |
| CUT-OFF KNIFE | | |
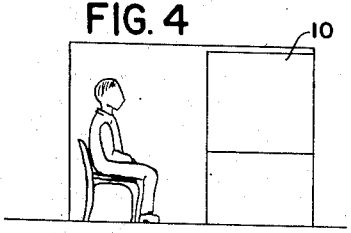
FIG. 4
LUTHER G. SIMJIAN
*INVENTOR.*
BY Ralph E. Bitner
ATTORNEY Jan. 11, 1955  L. G. SIMJIAN  2,699,100
CAMERA
Filed Jan. 9, 1953  2 Sheets-Sheet 2

LUTHER G. SIMJIAN
*INVENTOR.*

BY Ralph E. Bitner

ATTORNEY

United States Patent Office 2,699,100
Patented Jan. 11, 1955

2,699,100

CAMERA

Luther G. Simjian, Greenwich, Conn.

Application January 9, 1953, Serial No. 330,444

7 Claims. (Cl. 95—1.1)

This invention relates to a camera which has several automatic operating features and has particular reference to the identification of a camera film by means of a numbered ticket which is made available each time a picture is taken.

Many types of automatic cameras have been developed and marketed. Some are fully automatic since they take a picture, develop and fix a photograph, and then deliver it to the purchaser. While such cameras are convenient and fast, the pictures they produce are generally moist and not of very high quality. In addition, only rarely a photographic film is employed for preserving a directly reproducible record. The present invention overcomes many of these difficulties and is simple in construction. A picture is taken on a film which can be used to make many prints. At the same time a ticket is issued having an identifying number and a date. The purchaser receives one or more enlarged photographic prints by presenting the ticket to a photographic laboratory. Because the film is developed in a laboratory and enlargements are made under controlled conditions, the resulting prints can possess the high quality usually found in studio portraits.

One of the objects of this invention is to provide an improved camera which avoids one or more of the disadvantages and limitations of prior art arrangements.

Another object of the invention is to provide a simplified camera which can be used by the public to take portraits.

Another object of the invention is to provide a camera having many automatic features but which does not employ liquids for its operation.

Still another object of the invention is the provision of a photographic negative which is available to skilled laboratory personnel for rendering the best possible print thereof.

Another object of the invention is to insure positive identinfication of a film by photographing a ticket number on one portion of the film.

Another object of the invention is to simplify and improve the operation of coin operated cameras by issuing a numbered ticket immediately after a picture has been taken.

The invention comprises a coin-operated camera which includes a lens and a support for a sensitized photographic film. At one side of the film support a second lens system is mounted for photographing a number appearing on a roll of ticket paper. Lights are provided for illuminating an object or person in front of the lens and for illuminating the ticket paper. After the picture is taken the film is wound on a roll in a storage chamber and the ticket tape is unwound to a stamping position. Finally, the date of delivery is stamped on the ticket and it is cut from the roll, making it available to the person whose picture has been taken.

For a better understanding of the present invention, together with other and further objects thereof, reference is made to the following description taken in connection with the accompanying drawings.

Figure 1 is a perspective view of the camera.

Figure 2 is a plan view of the ticket issued by the machine.

Figure 3 is a timing diagram illustrating the operation of the various machine components.

Figure 4 is a side view indicating the position taken by a user of the machine.

Figure 5:
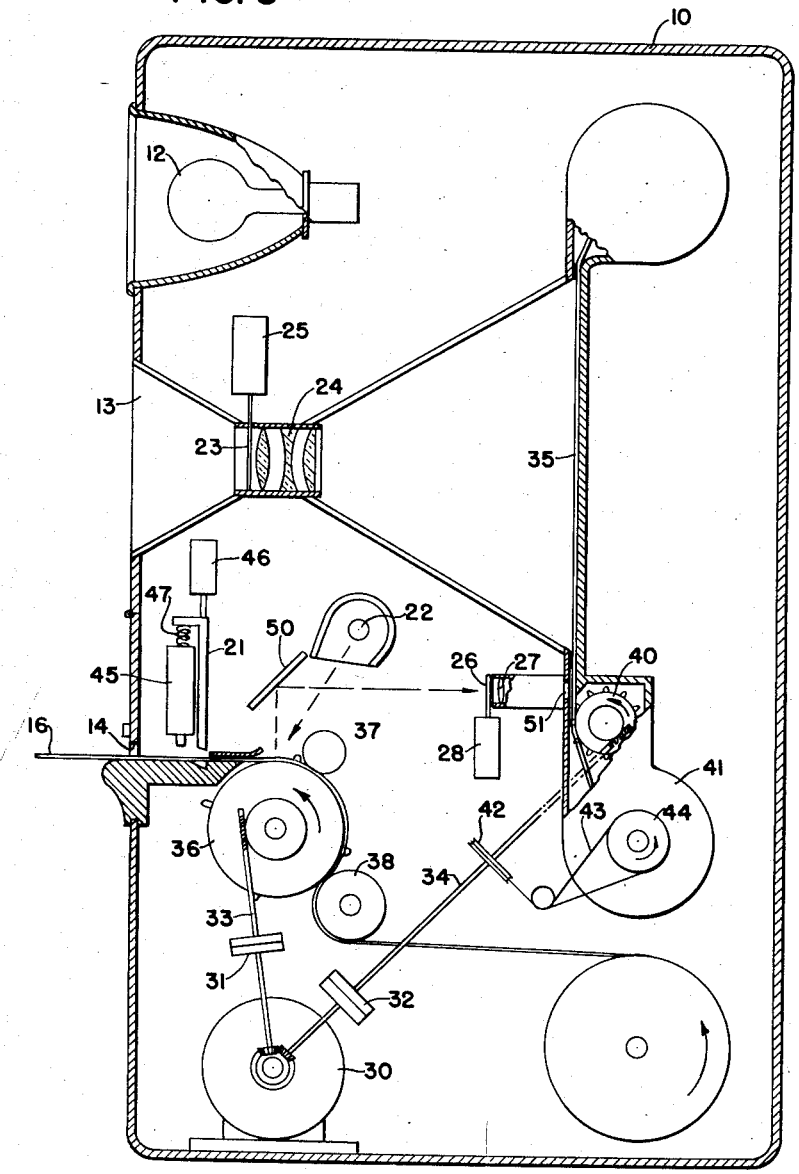
Figure 5 is a cross-sectional view of the camera, with some parts shown in elevation, and shows in schematic form all the essential components of the camera.

Referring now to the figures a camera box 10 contains all the components necessary for the operation of taking a picture and issuing an identifying ticket. The camera is generally operated by a coin-mechanism but this is not necessary when it is desired to have an operator in attendance. Figure 1 shows a coin slot 11 for receiving the coin. The coin operating mechanism is not shown in the drawings since these devices are old in the art and have been well developed. The camera also contains two or more lamps 12 which are lighted just prior to taking a picture. A lens aperture 13 is positioned adjacent to the lamps for admitting light to the camera lens. Just below the lens aperture is a slot 14 for issuing a ticket which bears an identifying number corresponding to the number on the film. Above slot 14 is a door 15 which can be opened by an operator in order to change the date which is stamped on the ticket.

The details of ticket 16 are shown in Figure 2 and include an identifying number 17 which is sequentially printed on all the tickets on a large roll. The roll of ticket tape is prepared with sprocket holes 18 which are employed to draw the tape through the machine without slippage and to correctly position the number 17 in an object plane where it may be photographed by the camera mechanism. After the number has been photographed, a date 20 is stamped on the ticket and a knife 21 (Figure 5) cuts the tape from the remainder of the roll making it available to the operator of the machine. The ticket is made large enough so that it may also contain detailed instructions for obtaining the finished photograph.

Figure 3 indicates in a general manner the sequential operation of the camera mechanism. The machine is started by an operator or by the coin mechanism. Shortly after the initial actuation the lights are turned on. This includes lights 12 for illuminating the person in front of the camera and also a small lamp 22 (Figure 5) for illuminating a small portion of the ticket tape. Soon after the lights are turned on two lens shutters are opened to admit light to the film. One lens shutter 23 is in front of the main lens 24 and is operated by an electromagnetic device 25. A second lens shutter 26 is in front of a second lens 27 and is operated by an electromagnetic device 28. The duration of shutter opening is obviously dependent upon the amount of illumination available, the lens opening, and the film speed. At the same time the shutters are opened a motor 30, positioned at the base of the machine, starts running but does not cause the actuation of any camera components because two clutches 31, 32 are initially disengaged. As indicated by the timing diagram the motor continues to run until the end of the operating cycle.

Operation of the lens shutters completes the picture taking cycle and the remainder of the camera operation includes tthe ticket issue and the movement of a portion of the unexposed film into the camera focal plane to be ready for the next picture taking operation. Clutches 31 and 32 are engaged by electromagnetic means and turn shafts 33 and 34 to advance the ticket tape 16 and the photographic film 35 to new positions. These clutches may be mechanisms which are set to revolve for one or more revolutions, or they may be mechanisms which are released by contact devices attached to the sprocket wheels which they turn. Shaft 33 turns a sprocket wheel 36 which engage holes 18 in the ticket tape. Since these holes are far apart the tape is pressed into engagement with the sprocket wheel for a considerable length by idler rollers 37 and 38. Clutch 32 turns shaft 34 which is geared to a film sprocket wheel 40 and draws the film 35 through the camera a predetermined amount. In order to take up the slack in storage compartment 41 a pulley 42 is mounted on shaft 34 and runs a string belt 43 which makes a slipping engagement with a pulley 44 to keep the film under a reasonable tension.

After the clutches are disengaged and the film and ticket tape are at their new positions a date stamp 45 and the knife 21 are actuated to stamp the tape with the date and to cut the tape. This operation may be done by a single power solenoid 46 which operates on the knife in a positive manner and carries the date stamp with it due to a resilient coupling 47. The date stamped on the ticket may be either the date when the finished photograph is obtainable or the date on which the picture was taken with a notation on the ticket that the finished photograph may be obtained a certain number of days subsequent to the date stamped. The change of date may be under the control of an attendant or may be accomplished by an automatic date changing machine which is well known in connection with industrial time clocks.

The number which is printed on the ticket tape always appears at a position which is directly beneath a mirror 50 and when the number is illuminated by lamp 22 the light from the tape is reflected by mirror 50 and focused by lens 27 through an aperture 51 to the film 35.

It will be obvious to those skilled in the art that the dual shutter system of Figure 5 comprising shutter 23 and shutter 26 may be replaced by a single focal plane shutter. Such a shutter then will be effective for the object to be photographed as well as for the identification marking to be taken from the ticket and recorded on the film near the image exposed section.

The controlling mechanism for operating the separate components have not been shown since such mechanisms are old in the art and have been extensively developed for other and similar automatic machines. One type of control comprises a segment commutator having contacts spaced around a periphery for sequentially operating the lights, shutters, clutches, motor, and knife. Another system of control comprises a series of relays having a time delay action, the operation of one relay starting after another relay has been normalized.

The commercial method of handling the exposed film, making an enlargement and delivering the finished picture to the purchaser is subject to many variations and is not to be considered a part of this invention.

While there have been described and illustrated specific embodiments of the invention, it will be obvious that various changes and modifications may be made therein without departing from the field of the invention which should be limited only by the scope of the appended claims.

I claim:

1. A photographic apparatus in combination with ticket storing and ticket dispensing means comprising, a camera for photographically recording on a sensitized emulsion the image of an object disposed in front of the camera, a ticket storing and dispensing means operatively connected to said camera, means for photographically recording an image of a dispensable ticket in associated relationship with the object image, and means for dispensing the ticket to a position exterior of the apparatus in response to an exposure actuating operation.

2. A photographic apparatus in combination with ticket storing and ticket dispensing means comprising, a camera for photographically recording on a sensitized emulsion in a focal plane the image of an object, means for illuminating the object disposed in front of the camera, a ticket storing and dispensing means disposed within the apparatus and operatively connected to said camera, means for illuminating a ticket, means for photographically recording the image of the ticket on said emulsion, and means for dispensing the ticket to a position exterior of the apparatus in response to an exposure operation.

3. A photographic apparatus in combination with ticket storing and dispensing means comprising, a camera for photographically recording on a sensitized film the image of an object disposed in front of the camera, a ticket storing and dispensing means operatively connected to said camera, means for photographically recording an image of the dispensable ticket in associated relationship with the object image, means for dispensing the recorded ticket to a position exterior of the apparatus in response to an exposure actuating operation, and means for moving a second ticket and the film to a position where an unexposed portion of the film is in a recording plane and the second ticket is in a position for recording.

4. A photographic apparatus in combination with ticket storing and dispensing means comprising, a camera for photographically recording on a sensitized emulsion the image of an object disposed in front of the camera, said camera including a lens and a shutter, a ticket storing and dispensing means within the apparatus and operatively connected to said camera, means for photographically recording an image of a dispensable ticket in associated relationship with the object image, said ticket storing means containing a plurality of tickets each having an identifying number thereon, and means for dispensing the ticket to a position exterior of the apparatus in response to an exposure actuating operation.

5. A photographic apparatus in combination with a ticket dispensing means comprising; means for photographically recording on a sensitized film the image of an object positioned exterior to the apparatus, said means including a first lens and a shutter; a plurality of identifying tickets stored within the apparatus; means for photographically recording an image of one of said tickets in associated relationship with the object image, said means including a second lens, a shutter, and a source of illumination for the ticket; and means for dispensing the recorded ticket at a position exterior of the apparatus in response to an exposure actuating operation.

6. A photographic apparatus in combination with a ticket dispensing means comprising; means for photographically recording on a sensitized film the image of an object positioned exterior to the apparatus, said means including a first lens and a shutter; a plurality of identifying tickets stored within the apparatus; means for photographically recording an image of one of said tickets in associated relationship with the object image, said means including a second lens, a shutter, and a source of illumination for the ticket; means controlled by an operator for opening said shutters to expose the film; means for moving the exposed film to a storage chamber and for moving the tickets so that an unrecorded ticket is moved into an object plane of the second lens; and means for dispensing the recorded ticket in response to an exposure actuating operation.

7. A photographic apparatus in combination with a ticket dispensing means comprising; means for photographically recording on a sensitized film the image of an object positioned exterior to the apparatus, said means including a first lens and a shutter; a plurality of identifying tickets stored within the apparatus; means for photographically recording an image of one of said tickets in associated relationship with the object image, said means including a second lens, a shutter, and a source of illumination for the ticket; means for moving the exposed film to a storage chamber; means for moving the recorded ticket to a position where it can be stamped with a date; and means for dispensing the recorded ticket in response to an exposure actuating operation.

References Cited in the file of this patent

UNITED STATES PATENTS

| Number | Name | Date |
|---|---|---|
| 1,801,458 | Satterlee | Apr. 21, 1931 |
| 1,808,118 | Petersen | June 2, 1931 |
| 1,826,664 | Hopkins | Oct. 6, 1931 |